US009721142B2

(12) United States Patent
Russo

(10) Patent No.: US 9,721,142 B2
(45) Date of Patent: Aug. 1, 2017

(54) MULTI-RESOLUTION FINGERPRINT SENSOR

(71) Applicant: Synaptics Incorporated, San Jose, CA (US)

(72) Inventor: Anthony P. Russo, New York, NY (US)

(73) Assignee: Synaptics Incorporated, San Jose, CA (US)

( * ) Notice: Subject to any disclaimer, the term of this patent is extended or adjusted under 35 U.S.C. 154(b) by 47 days.

(21) Appl. No.: 14/752,728

(22) Filed: Jun. 26, 2015

(65) Prior Publication Data
US 2016/0379037 A1 Dec. 29, 2016

(51) Int. Cl.
*G06K 9/00* (2006.01)

(52) U.S. Cl.
CPC ........ *G06K 9/00114* (2013.01); *G06K 9/0002* (2013.01)

(58) Field of Classification Search
None
See application file for complete search history.

(56) References Cited

U.S. PATENT DOCUMENTS

| 6,628,810 | B1 | 9/2003 | Harkin |
| 7,734,074 | B2 | 6/2010 | Setlak et al. |
| 8,275,178 | B2 | 9/2012 | Boshra |
| 8,374,407 | B2 | 2/2013 | Benkley et al. |
| 8,564,314 | B2 | 10/2013 | Shaikh et al. |
| 2006/0182319 | A1* | 8/2006 | Setlak ............... G06K 9/00026 382/124 |
| 2007/0154073 | A1 | 7/2007 | Hamid et al. |
| 2007/0258629 | A1* | 11/2007 | Bartsch ............. G06K 9/00067 382/128 |
| 2008/0219522 | A1* | 9/2008 | Hook ................. G06K 9/00906 382/124 |
| 2009/0067684 | A1* | 3/2009 | Mainguet ............ G06K 9/0002 382/124 |
| 2010/0046810 | A1 | 2/2010 | Yamada |

(Continued)

FOREIGN PATENT DOCUMENTS

EP 2645712 A1 10/2013

OTHER PUBLICATIONS

International Search Report for PCT/US2016/035891 preformed within the Korean Intellectual Property Office (Mailing date Sep. 20, 2016).

*Primary Examiner* — Hadi Akhavannik
(74) *Attorney, Agent, or Firm* — Leydig, Voit & Mayer, Ltd

(57) ABSTRACT

Multi-resolution fingerprint sensors and methods of using the same are provided. The multi-resolution fingerprint sensors each include a portion of the imaging area or region of the sensor that provides higher imaging resolution than the remaining imaging area of the sensor. The area of higher resolution is useful for anti-spoofing purposes, but because only a portion of the sensor is higher-resolution, advantageously it will not impact hardware costs nearly as much as a sensor that was higher resolution over its entire imaging area. Furthermore, the higher resolution area can be downsampled so there would be no impact on the standard matcher and image processing software stack, which expects a uniform resolution for the entire image acquired.

22 Claims, 9 Drawing Sheets

Example A: high res patch in center, using similar off-chip line trace sensing approach. Dark gray is high-res patch, light gray is only high-res in one dimension.

(56) References Cited

U.S. PATENT DOCUMENTS

2011/0007951 A1* 1/2011 Mil'shtein ......... G06K 9/00033
382/124
2014/0270419 A1 9/2014 Schuckers et al.
2014/0300574 A1 10/2014 Benkley, III et al.

* cited by examiner

Example A: high res patch in center, using similar off-chip line trace sensing approach. Dark gray is high-res patch, light gray is only high-res in one dimension.

Example B: high res patch in center, using on-silicon sensing approach. Dark gray is high-res patch.

MULTI-RESOLUTION FINGERPRINT SENSOR

FIELD OF THE DISCLOSURE

This disclosure generally relates to biometric recognition and, more particularly, to multi-resolution fingerprint sensors and methods of using the same.

BACKGROUND OF THE DISCLOSURE

Biometric authentication systems are used for enrolling and authenticating users of devices incorporating the authentication systems. Biometric sensing technology provides a reliable, non-intrusive way to enroll and verify individual identity for authentication purposes.

Fingerprints, like certain other biometric characteristics, are based on unalterable personal characteristics and thus are a reliable mechanism to recognize individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particular portable applications, may require electronic fingerprint sensing systems that are compact, highly reliable, and inexpensive.

Fingerprint sensors are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. A processing system then reconstructs the scans into a larger swipe image. Since the image is reconstructed from a series of scans, this allows the sensing array to be made small, even as small as a single scan line, while still capturing a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

As fingerprint sensors shrink in size, whether for the purpose of packaging them into smaller portable devices, to reduce cost, or for other reasons, accurate and usable fingerprint recognition becomes a challenging task. The fingerprint recognition system should capture a sufficient area of the fingerprint to discriminate between different users. It is possible for a swipe sensor to capture a much larger area of the fingerprint than the sensor size, allowing the fingerprint sensor to be made small while still capturing a larger area swipe fingerprint image with enough fingerprint information to easily discriminate between users. Unfortunately, some users find the process of swiping their finger over the sensor every time they want to access the system to be cumbersome.

Placement sensors provide an attractive solution for many users, since they allow the user to simply hold their finger over the sensor. However, there are several technical challenges with small placement sensors that only capture a partial fingerprint image. Because only a partial area of the fingerprint that corresponds to the size of the sensor is captured, the matching process should ideally be tailored to quickly and accurately match based on limited fingerprint information, a task for which conventional matching algorithms based on full fingerprint images are often poorly equipped. Furthermore, since the sensor is only large enough to capture a partial fingerprint image during placement, in ordinary use the user is likely to present different portions of the same fingerprint on different occasions when attempting to access the system. The recognition system should ideally be able to recognize the fingerprint without requiring the user to present the same small portion of the fingerprint every time.

BRIEF SUMMARY OF THE DISCLOSURE

The present disclosure provides a multi-resolution fingerprint sensor and methods of using the same. The multi-resolution fingerprint sensor includes a portion of the imaging area or region of the sensor that provides higher imaging resolution than the remaining imaging area of the sensor. The area of higher resolution would be useful for anti-spoofing purposes, but because only a portion of the sensor is higher-resolution, advantageously it will not impact hardware costs nearly as much as a sensor that was higher resolution over its entire imaging area. Furthermore, in some embodiments, the higher resolution area can be down-sampled so there would be no impact on the standard matcher and image processing software stack, which typically expects a uniform resolution for the entire image acquired.

According to an embodiment, a method of processing an image obtained with a multi-resolution biometric sensor is provided. The sensor includes a first sensing region and second sensing region, the first sensing region having a resolution lower than a resolution of the second sensing region. The method typically includes acquiring a first image of an input object, the first image including an area of the input object imaged by only the second sensing region of the multi-resolution sensor, and acquiring a second image of the input object, the second image including an area of the input object imaged by both the first sensing region and the second sensing region of the multi-resolution sensor. The method also typically includes processing each of the first image and the second image to determine biometric information of the input object. The first image and second image may be processed separately or simultaneously. In certain aspects, the first (e.g., lower resolution) sensing region (at least partially) circumscribes the second sensing region.

In certain aspects, the first image and the second image are imaged separately in time, wherein the second image is acquired with the second (e.g., higher resolution) sensing region operating in a low resolution mode such that the second image has a uniform resolution at the resolution corresponding to the first sensing region. In certain aspects, the second region operating in the low resolution mode includes addressing a portion of address lines of the second sensing region.

In certain aspects, an initial image of the input object is imaged simultaneously using both the first sensing region and the second sensing region. In one aspect, the acquiring the first image includes cropping the initial image to remove the area of the input object imaged by the first (e.g., lower resolution) sensing region. In another aspect, the acquiring the second image includes adjusting a resolution of the area of the input object imaged by the second (e.g., higher resolution) sensing region to match the resolution of the first sensing region to produce a uniform-resolution image. In certain aspects, the adjusting the resolution includes down-sampling the area of the input object imaged by the second (e.g., higher resolution) sensing region.

In certain aspects, the input object includes a fingerprint. In certain aspects, the processing includes processing the first image to determine whether the fingerprint is a legitimate fingerprint, e.g., for anti-spoofing detection. In certain aspects, the processing includes validating the fingerprint using the second image.

In certain aspects, the second sensing region of the sensor comprises sensor electrodes disposed at a pitch less than a sensor electrode pitch of sensor electrodes disposed in the first sensing region. In certain aspects, sensor electrodes of the first sensing region are electrically (e.g., ohmically) connected to sensor electrodes of the second sensing region. In certain aspects, the multi-resolution sensor includes one of a transcapacitive sensor, an absolute capacitive sensor, an optical sensor, a thermal sensor, or an ultrasonic sensor.

BRIEF DESCRIPTION OF THE DRAWING(S)

The accompanying drawings incorporated in and forming a part of the specification illustrate several aspects of the present disclosure and, together with the description, serve to explain the principles of the disclosure. In the drawings.

Figure 8:
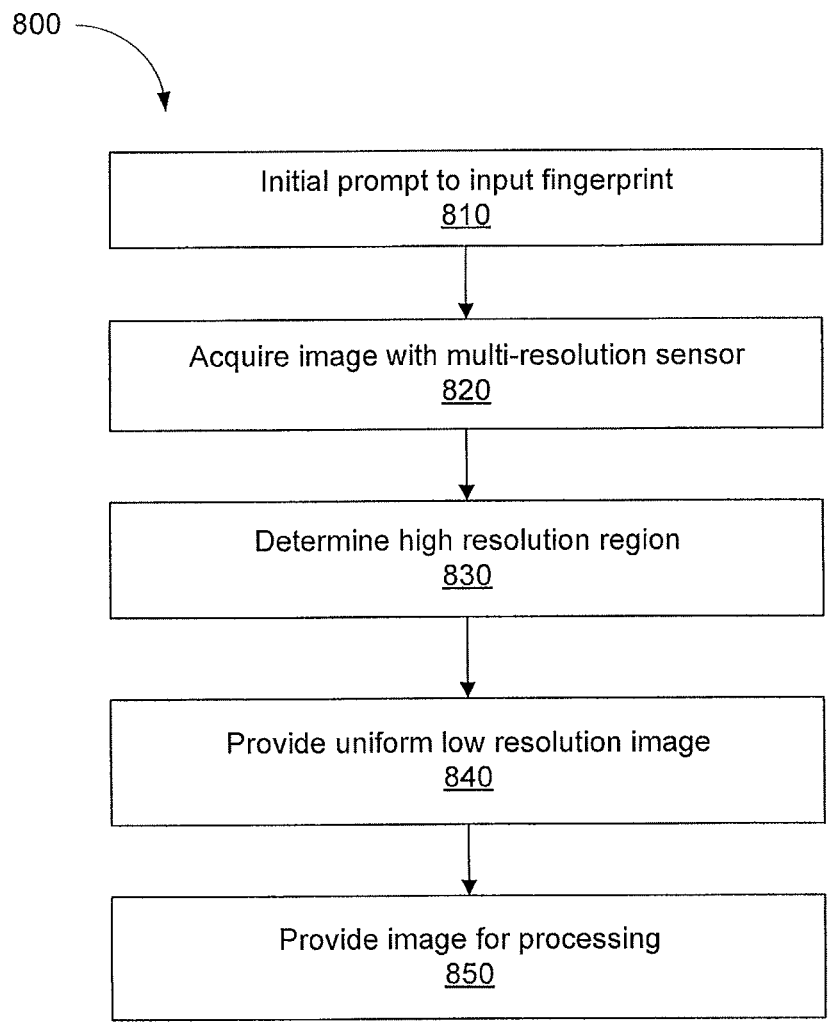
Figure 9:
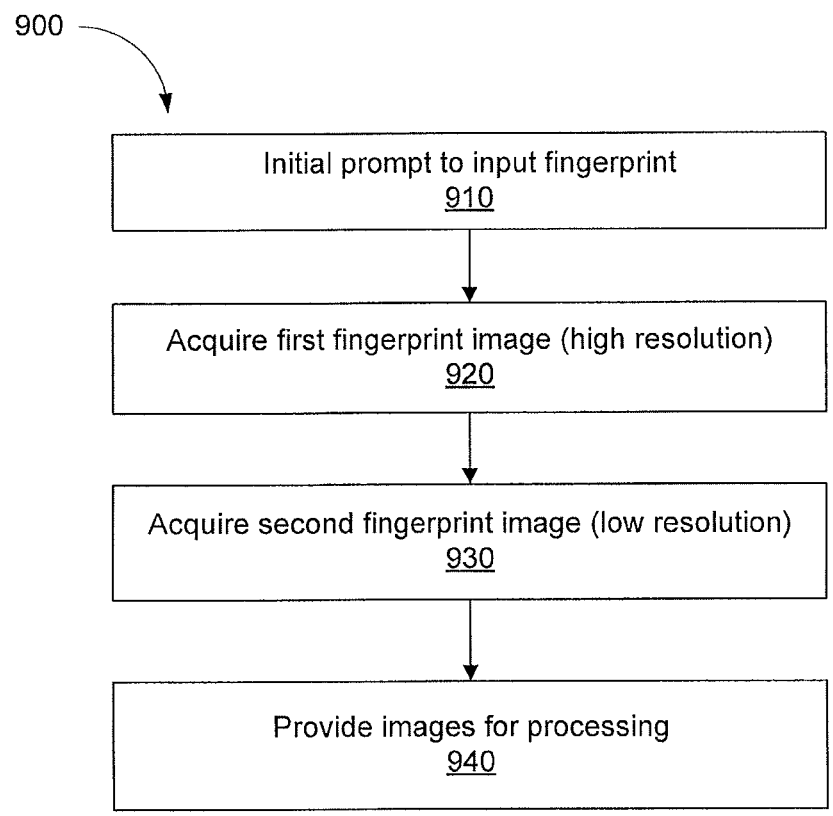

FIG. 8 illustrates a flow chart for processing an image obtained with a multi-resolution biometric sensor having a low resolution sensing region and a high resolution sensing region, where the low resolution sensing region has a resolution lower than a resolution of the high resolution sensing region, according to an embodiment; and FIG. 9 illustrates a flow chart for processing an image obtained with a multi-resolution biometric sensor having a low resolution sensing region and a high resolution sensing region, where the low resolution sensing region has a resolution lower than a resolution of the high resolution sensing region, according to another embodiment.

DETAILED DESCRIPTION OF THE DISCLOSURE

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Various embodiments of the present disclosure provide input devices and methods that facilitate improved usability.

Figure 1:
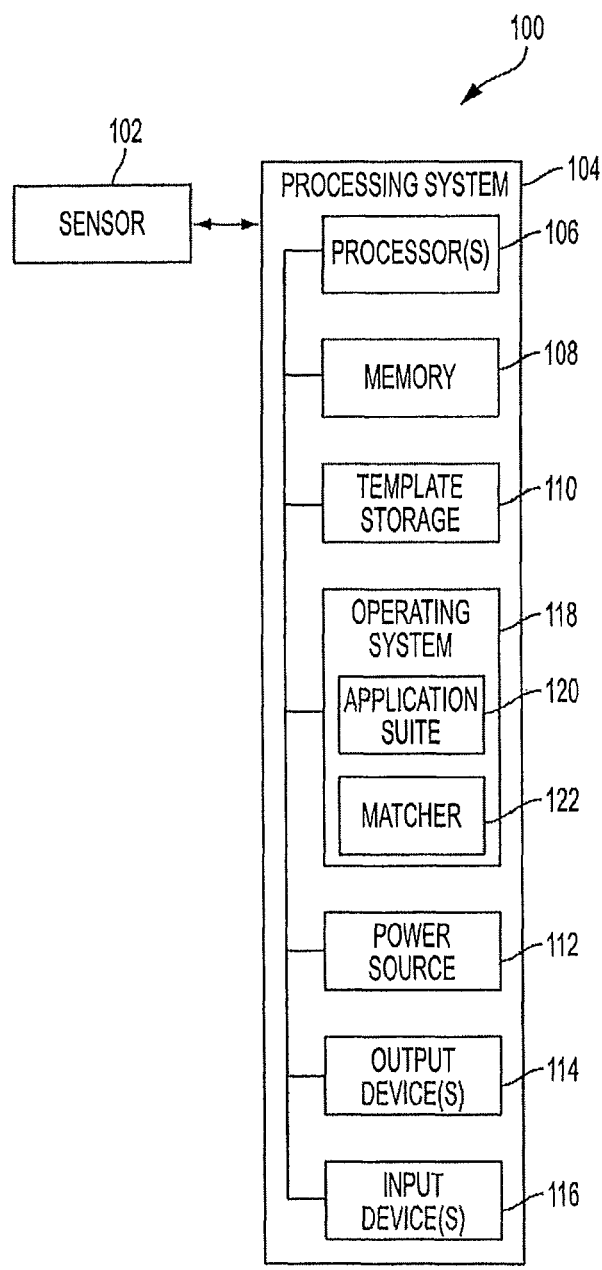
FIG. 1 is a block diagram of an exemplary device that includes an input device and processing system, in accordance with an embodiment of the disclosure.

Turning now to the figures, FIG. 1 is a block diagram of an electronic system or device 100 that includes an input device, such as sensor 102, and processing system 104, in accordance with an embodiment of the disclosure. As used in this document, the term "input device" and "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. For example, sensor elements of sensor 102 may be integrated in a display device that is itself implemented as a physical part of the electronic device 100 or communicably coupled with the electronic device 100. As appropriate, the sensor 102 may communicate with parts of the electronic device 100 using any one or more of the following communication interconnections: buses, networks, and other wired or wireless interconnections. Examples include I$^2$C, SPI, PS/2, Universal Serial Bus (USB), Bluetooth, RF, and IRDA.

Generally, sensor 102 will be utilized as a fingerprint sensor utilizing one or more various electronic fingerprint sensing methods, techniques and devices to capture a fingerprint image of a user. Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor.

In some embodiments, the sensor 102 is a capacitive fingerprint sensor, with the traces that form a 2D grid array, e.g., with rows of transmitter/receiver traces on one substrate and columns of receiver/transmitter traces on the same or a separate substrate, e.g., laminated together with some form of dielectric between the traces to form a 2D sensor element array.

Furthermore, biometric image sensors, such as fingerprint sensors, are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. In some applications, a processing system may reconstruct the scans into a larger swipe image. Since the image may be reconstructed from a series of scans, this allows the sensing array to be made small, even as small as a single scan line, while still capturing a larger area image. In some applications, a larger image area can be stored as a series of scans using a map or mapping function that correlates the various scan images. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Placement sensors have an active sensing surface or in other terms, sensing area, that is large enough to accommodate a portion of the relevant part of the fingerprint of the finger during a single scan or sensing action. Where the relevant part of the fingerprint is less than the full fingerprint, this is referred to herein as a "partial" fingerprint sensor. Partial fingerprint placement sensors can be made very small and still reliably recognize fingerprints with sophisticated matching schemes. In one embodiment of this disclosure, a partial fingerprint sensor is used with a sensing area less than approximately 50 square mm. In another embodiment, a partial fingerprint sensor is used with a sensing area less than approximately 30 square mm. Typically, for placement sensors, the finger is held stationary over the sensing area during a measurement. During a fingerprint enrollment process, multiple views of the fingerprint image may be captured.

Generally, swipe sensors can be made smaller in size than placement sensors that capture an equivalent fingerprint area, and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. In certain embodiments of this disclosure, a placement sensor may be operated in a swipe mode. In these embodiments, a placement sensor may capture a swipe image by capturing a series of scans during relative motion between the sensor array and the user's fingerprint, and the series of scans are reconstructed into a larger area swipe image. In one implementation, the placement sensor captures the scans using its entire sensor array. In another implementation, the placement sensor looks to only a subset of pixels in its sensor array, such as one or two scan lines, when capturing the swipe image.

Turning now to the processing system 104 from FIG. 1, basic functional components of the electronic device 100 utilized during capturing and storing a user fingerprint image are illustrated. The processing system 104 includes a processor 106 (or multiple processors), a memory 108, a template storage 110, a power source 112, an output device(s) 114, an input device(s) 116 and an operating system (OS) 118 hosting an application suite 120 and a matcher 122. Each of the processor 106, the memory 108, the template storage 110, the power source 112, the output device(s) 114, the input device(s) 116 and the operating system 118 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment data such as enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 includes one or more power sources 112 to provide power to the electronic device 100, and in some embodiments to sensor 102. Non-limiting examples of power source 112 include single-use power sources, rechargeable power sources, and/or power sources developed from nickel-cadmium, lithium-ion, or other suitable material.

The processing system 104 includes one or more input devices 116. Input devices 116 are configured to receive input from a user or a surrounding environment of the user through tactile, audio, and/or video feedback. Non-limiting examples of input device 116 include a presence-sensitive screen, a mouse, a keyboard, a voice responsive system, video camera, microphone or any other type of input device. In some examples, a presence-sensitive screen includes a touch-sensitive screen. In certain embodiments, the sensor 102 may be included as an input device 116.

One or more output devices 114 are also included in processing system 104. Output devices 114 are configured to provide output to a user using tactile, audio, and/or video stimuli. Output device 114 may include a display screen (e.g., part of the presence-sensitive screen), a sound card, a video graphics adapter card, or any other type of device for converting a signal into an appropriate form understandable to humans or machines. Additional examples of output device 114 include a speaker such as headphones, a cathode ray tube (CRT) monitor, a liquid crystal display (LCD), or any other type of device that can generate intelligible output to a user.

The processing system 104 also hosts an operating system 118. The operating system 118 controls operations of the components of the processing system 104. For example, the operating system 118 facilitates the interaction of the processor(s) 106, memory 108, template storage 110, power source 112, output devices 114 and input devices 116. The operating system 118 further hosts the application suite 120. The application suite 120 contains applications utilizing data stored on the memory 108 or the template storage 110 or data collected from input devices 112 or the sensor 102 to cause the processing system 104 to perform certain functions.

In certain embodiments, the application suite 120 hosts an enroller application, which functions to capture one or more views of the user's fingerprint. The views or fingerprint images generally contain a partial or full image of the user's fingerprint. The enrollment application instructs, either explicitly or implicitly, the user to hold or swipe their finger across the sensor 102 for capturing or acquiring the image of the fingerprint. After each requested image is captured, the enrollment application typically stores the captured image in the template storage 110. In certain embodiments, the enrollment application will cause the data representing the captured image to undergo further processing. For instance, the further processing may be to compress the data representing the captured image such that it does not take as much memory within the template storage 110 to store the image.

In certain embodiments, the application suite 120 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 118 to request the user's fingerprint for an authentication process prior to undertaking a specific action, such as providing access to the OS 118 during a logon process for the electronic device 100. To perform this process, the above listed applications will utilize the matcher 122 hosted by the operating system 118.

Figure 2B:
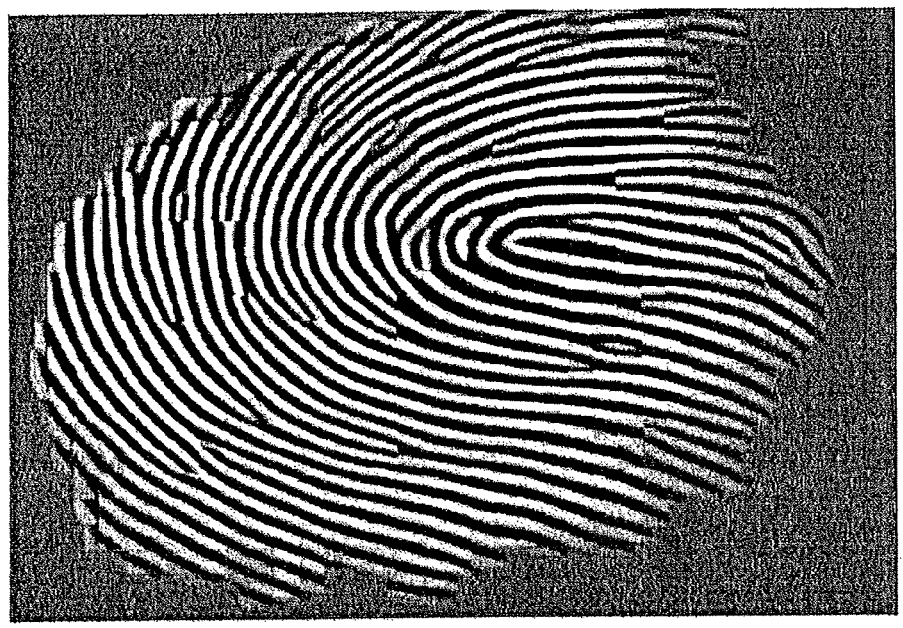
FIG. 2B is an enhanced image of the fingerprint of FIG. 2A, in accordance with an embodiment of the disclosure.
Figure 2A:
FIG. 2A is an image of a fingerprint, in accordance with an embodiment of the disclosure.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B is an enhanced image of the fingerprint of FIG. 2A.

Figure 3:
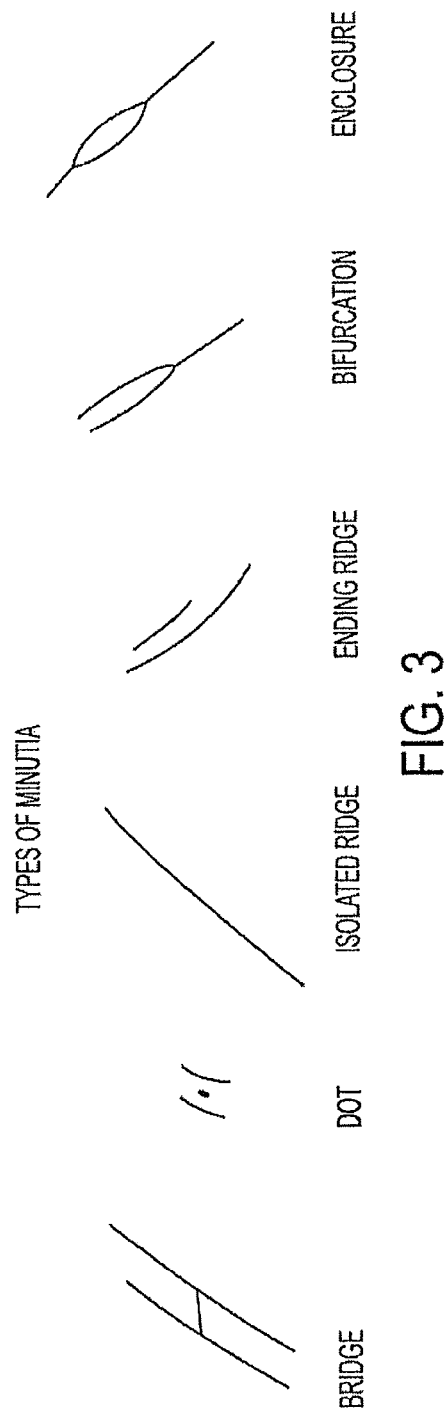
FIG. 3 is an illustration of various types of minutiae points of a fingerprint, in accordance with an embodiment of the disclosure.

FIG. 3 illustrates various types of fingerprint minutia, according to some embodiments. Examples of fingerprint minutia include: a bridge point between two or more ridges, a dot, an isolated ridge, an ending ridge, a bifurcation point, and an enclosure. Other minutia point types not shown in FIG. 3 are also within the scope of the disclosure. Each minutia point in a fingerprint image is associated with a location (in two dimensions) and an orientation. In some embodiments, the orientation of a minutia point corresponds to the tangent of the ridge going through the minutia point.

Figure 4B:
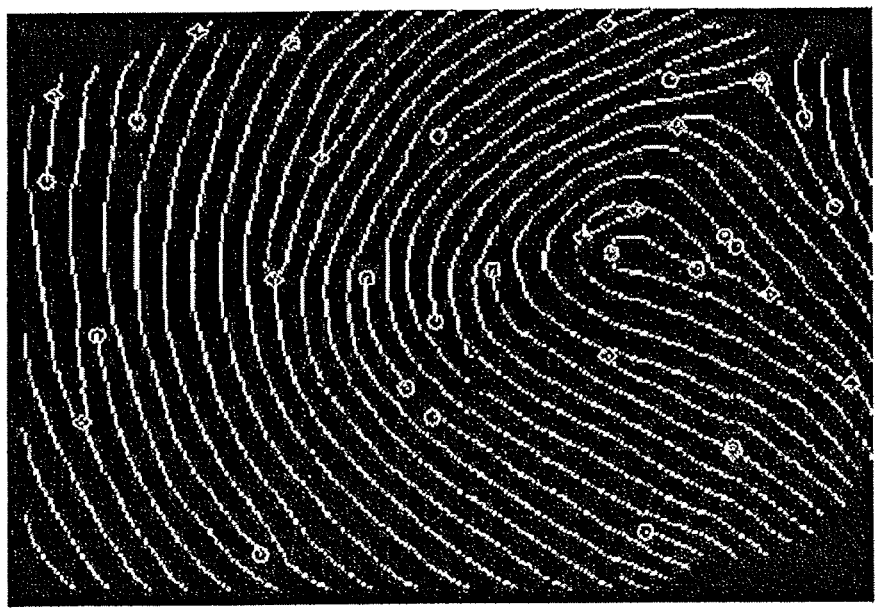
FIG. 4B is a thin-ridge version of the fingerprint of FIG. 4A, in accordance with an embodiment of the disclosure.
Figure 4A:
FIG. 4A is an image of a fingerprint, in accordance with an embodiment of the disclosure.

FIG. 4A illustrates a grayscale fingerprint image that shows various ridges and minutiae of a fingerprint, according to one embodiment. FIG. 4B illustrates a thin-ridge version of the grayscale fingerprint image in FIG. 4A, according to one embodiment. Fingerprint skeletonization, also sometimes referred to as an "edge map," "edge image," or "thinned ridge image," depending on the context, is the process of converting the ridge lines in a grayscale fingerprint image (see, for example, the image in FIG. 4A) to a binary representation, and reducing the width of binarized ridge lines to one pixel wide. As can be seen in FIG. 4B, the skeletonized version of the grayscale fingerprint image removes much of the noise so that the image is no longer cloudy and the ridge lines are no longer broken.

Additionally, in embodiments where the sensor 102 (see FIG. 1) is a partial fingerprint sensor such as a partial placement sensor, due to the size of the sensing area of the sensor 102 typically being smaller than the user's fingerprint area, a multitude of placement images of the user's fingerprint from the placement sensor 102 may be collected to form the enrollment template such that it adequately describes the user's fingerprint. As the multitude of placement images are collected, the enroller function of the application suite 120 calls on the matcher 122 to relate the placement views with each other such that they can be grouped into an accurate composite of the user's fingerprint.

Relating the various placement views to one another requires localization of each placement view, which specifies a location within the user's fingerprint of an individual placement view. In certain embodiments, to assist in localization, the placement image is converted into an orientation representation, which specifies a directional orientation of each ridge of the placement image on a pixel by pixel basis, or at a lower resolution depending on the coarseness used. Essentially, each pixel in a ridge converted to the orientation representation is represented by data describing the orientation or direction of the ridge. As an aside, once converted to the orientation representation, the placement image may be referred to as an orientation map. Further, in certain embodiments, prior to converting to the orientation space, the placement image is converted to a thin ridge version of the placement image, and then the thin ridge image is converted to the orientation space. As additional placement images are collected and converted to an orientation space, the matcher 122 (see FIG. 1) will begin to localize each placement view based on ridges having a similar orientation.

Figure 5:
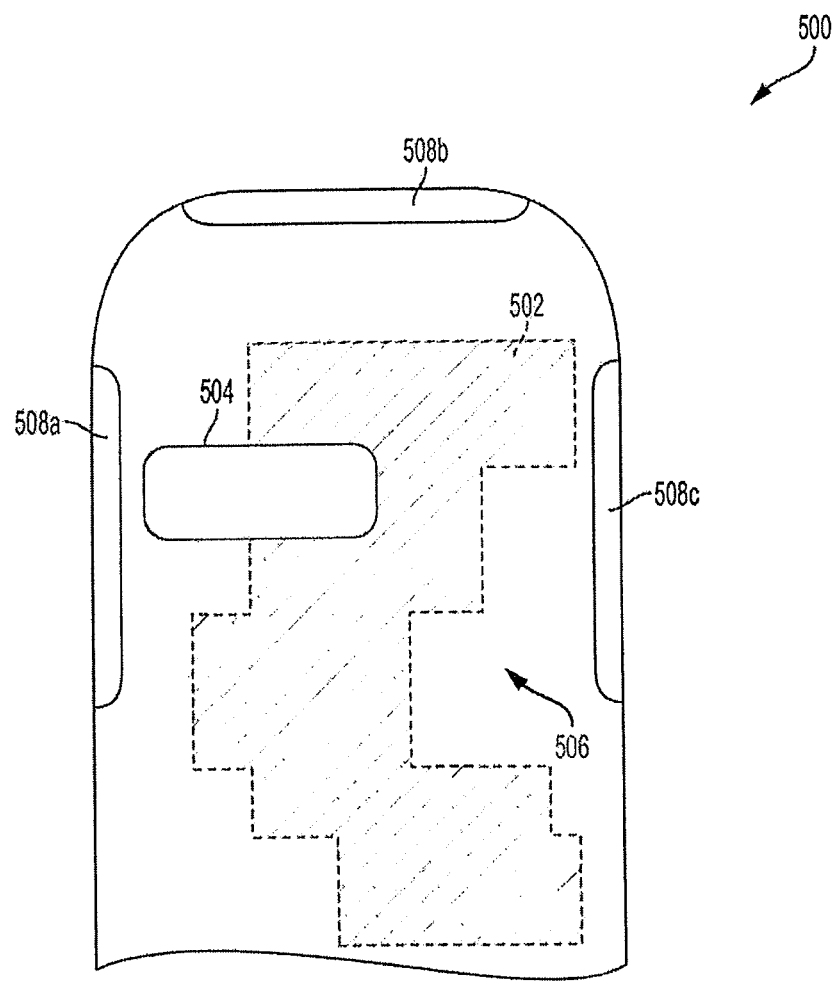
FIG. 5 is an illustration of a user's fingerprint, in accordance with an embodiment of the disclosure.

FIG. 5 is an illustration of an exemplary embodiment of a user's fingerprint 500 showing a collection of localized placement views that form a portion 502 of the user's fingerprint 500. A recently collected placement view 504 is illustrated in relation to the portion 502. The placement view 504 will be localized in comparison to the portion 502 in order to determine how it fits along with the rest of portion 502. In the illustrated embodiment, placement view 504 overlaps with the portion 502 of the user's fingerprint already localized and collected into the enrollment template. However, in other embodiments, the placement view 504 may not overlap with the portion 502, or only have a small overlap resulting in a low confidence in the alignment, such that localizing the placement view 504 by comparing to previous localized portions of the fingerprint becomes more difficult. In addition, multiple disconnected views or clusters of views may result, and for which reliable alignment becomes difficult without a global reference for localization. As further illustrated, a portion 506 of the user's fingerprint 500 has not been presented to the placement sensor 102 and therefore has not been collected for adding to the enrollment template. However, as the enroller of the application suite 120 and the matcher 122 do not have prior knowledge of the user's fingerprint 500, the portion 506 of the user's fingerprint that has not been collected is an unknown. Therefore, in situations where there is no overlap between the placement view 504 and the collected portion 502, it becomes difficult to locate where the placement view 504 should be located in the uncollected portion 506 in relation to the collected portion 502.

Figure 6A:
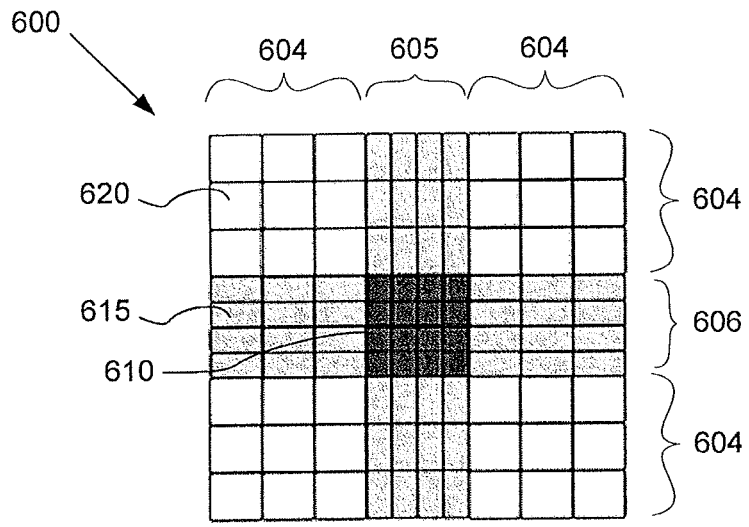
FIG. 6A illustrates an example of a multi-resolution sensor according to an embodiment including off-chip line sensing traces.
Figure 6B:
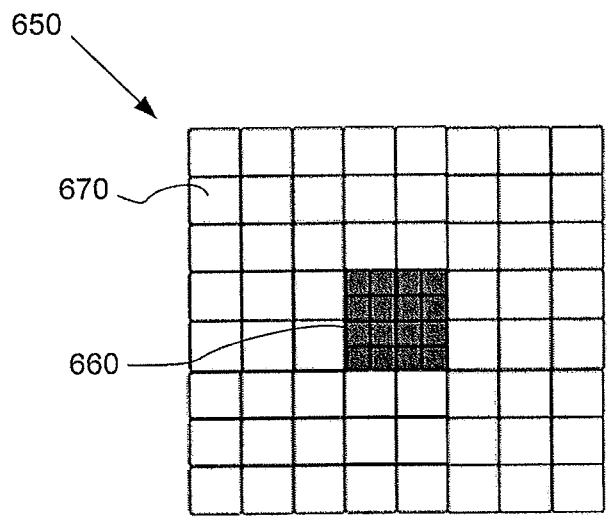
FIG. 6B illustrates an example of a multi-resolution sensor according to an embodiment including individually addressable sensor electrodes or pixels.

FIGS. 6A-6B illustrate examples of multi-resolution sensors according to embodiments. Each rectangle represents an imaging pixel. For example, each pixel may be implemented using a drive electrode and sense electrode pair. Electrode elements may be addressed by an electrode array control circuit (not shown) as is well known. The control circuit may interface or communicate with various system elements, including processing system 104. FIG. 6A illustrates an example of a multi-resolution sensor 600 according to an embodiment including off-chip line sensing traces, e.g. in a capacitive sensor. The traces may be formed on a rigid or a flexible substrate. The imaging resolution of a sensing region is defined by the density of sensor electrodes or pixel elements ("pixels") in the region. As shown, sensor 600 includes a first sensing region 610 (shown in dark grey) defined by the column traces 605 and row traces 606. Column traces 605 and row traces 606 have the same pitch or spacings in one embodiment, but they may have different spacings in other embodiments. In one embodiment, the spacings of row and column traces 604 are greater that the spacings of column traces 605 and row traces 606, so that sensing region 610 has a higher pixel density than surrounding sensing regions 615 and 620. For example, the pitch of the sensor electrodes or pixels of sensing region 610 is less than a pitch of the sensor electrodes or pixels in sensing region 620 and sensing region 615. In this manner, the possible imaging resolution of a biometric input object imaged by sensing region 610 is higher than a possible imaging resolution of the biometric object imaged by sensing region 615 and sensing region 620. Sensing region 615 has a higher imaging resolution than the imaging resolution of sensing region 620 along only one dimension, as shown in light grey. As used herein, sensing region 610 may be referred to as a high resolution region or patch or a higher resolution region or patch (e.g., relative to sensing regions 615 and 620); whereas, sensing regions 615 and 620 may be referred to as low resolution region or lower resolution regions.

FIG. 6B illustrates an example of a multi-resolution sensor 650 according to an embodiment including individually addressable sensor electrodes or pixels. As shown, sensor 650 includes a first sensing region 660 (shown in dark grey) and a second sensing region 670 circumscribing the first sensing region 660. The imaging resolution of a sensing region is defined by the density of sensor electrodes or pixels in the region. In one embodiment, sensing region 660 has a higher pixel density than surrounding sensing region 670. For example, the pitch of the sensor electrodes or pixels of sensing region 660 is less than a pitch of the sensor electrodes or pixels in sensing region 670. Hence, the possible imaging resolution of a biometric input object imaged by sensing region 660 is higher than a possible imaging resolution of the biometric object imaged by sensing region 670. As used herein, sensing region 660 may be referred to as a high resolution region or patch or a higher resolution region or patch (in relation to region 670), whereas sensing regions 670 may be referred to as a low resolution region or a lower resolution region.

In certain embodiments, the high resolution patch of sensors 600 and 650 may be positioned anywhere within the entire sensing region of the biometric sensor. For example, as shown, each high resolution region (610, 660) is shown as positioned in a central region of the sensor (600, 650); however, each high resolution region may be positioned off-center, e.g., along an edge of the sensor, or proximal an edge or the sensor, or in a corner of the sensor or proximal a corner of the sensor. Also, each high resolution region (610, 660) is shown as being symmetrical, e.g., having a same number of pixels along two orthogonal directions; however, each high resolution region may be asymmetrical, e.g., having more pixels along one direction than the other, orthogonal direction. Additionally, each high resolution region (610, 660) is shown as being a single contiguous region of pixels; however, each high resolution region may include multiple separate or distinct regions of pixels within the sensor region. Further, each high resolution region (610, 660) may include a higher resolution along only one dimension, but not both dimensions of the two-dimensional sensing region. Additionally, each high resolution region (610, 660) need not be a geometric sub-set of the low resolution region. For example, the first N rows could be high resolution and the remaining rows could be low resolution.

FIGS. 6A-6B show examples of high resolution sensor regions with spacings of sensor electrodes where the pitch is increased by 2×, e.g., pitch of pixel elements (e.g., sensor electrodes) in the high resolution region is half the pitch of pixel elements in the low resolution region. In certain embodiments, the pitch of the pixel elements in the low resolution region is an integer multiple of a pitch of the pixel elements in the high resolution region. For example, the pitch of pixel elements (e.g., sensor electrodes) in the high resolution region is 1/N the pitch of pixel elements in the low resolution region, where N is an integer. Practical examples include N=2 (e.g., FIGS. 6A-6B), N=3, N=4, . . . , N=10, etc. N can range as high as the pixel element forming technology will allow.

In one embodiment, each high resolution region (610, 660) has an area of about 1 mm$^2$ or greater and the entire sensing region of each sensor (600, 650) has a total sensing area of about 16 mm$^2$ or greater. In certain embodiments, the resolution of the low resolution region will have a pitch about 300 dpi (pixels per inch) or higher, and the resolution of the high resolution region will have a pitch about 500 dpi or greater. In some examples, for a placement sensor, the total sensing area can range from about 12 mm$^2$ to 100 mm$^2$, with example sizes 4 mm×3 mm, 10 mm×4 mm or 10 mm×10 mm. In some cases, a sensor area of 4 mm$^2$ is a very small and may be an impractical size. In some examples, for a swipe sensor, 4 mm$^2$ is a reasonable value since it could be, for example, about 8 mm wide×0.5 mm high. In some examples, the high resolution region is about 1 mm$^2$ to 4 mm$^2$.

As one example, consider a sensor having a total sensing area of about 100 mm$^2$ or (10 mm×10 mm), with 363 dpi (or pixels per inch), meaning a 70 um pitch. A 10 mm wide sensing area has roughly 142 pixels along its width. If for 2 mm the resolution is increased by a factor of 2 to 726 dpi, there would be a maximum of 114+57=171 pixels along the width. A fully high-resolution 726 dpi part, on the other hand, would require 284 pixels. Such a sensor provides advantages from an I/O point of view, but without the cost and complexity required to produce, and to process signals from, a full resolution sensor. For example, if one were to build a sensor with, say 1000 dpi, the hardware costs would get much higher, e.g., due to increase in number of interconnects (I/O pins) to the silicon. But if a small patch of higher resolution is used, then only a few more I/Os are needed. Also gained is an area of high-resolution that can be used for anti-spoofing purposes. For example, an anti-spoofing application (in application suite 120) can use the higher resolution image to detect micro-features such as pores and spoof material defects to identify fake fingers.

Figure 7:
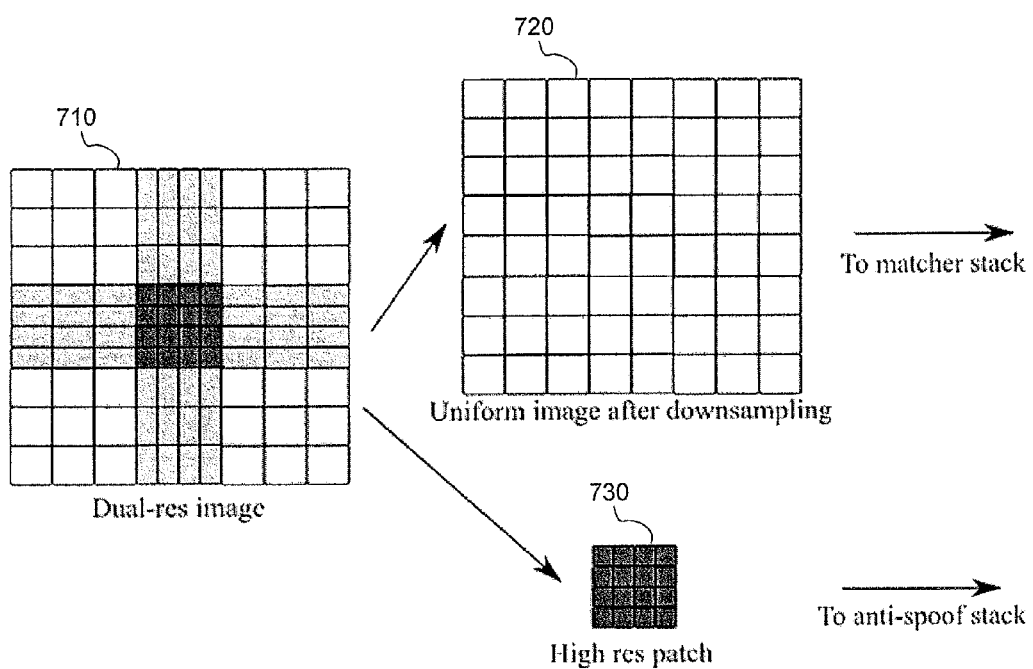
FIG. 7 illustrates an example of processing an image or images acquired using a multi-resolution sensor according to an embodiment.

In certain embodiments, an image for matching and anti-spoofing purposes could be acquired and processed in multiple ways. For example, in one embodiment, with reference to sensor 600 or sensor 650 and FIG. 7, a multiple-resolution image 710 of a biometric input object (such as a fingerprint) is acquired such that the image includes a first image area corresponding to the low resolution sensing region of the sensor and a second image area corresponding to the high resolution sensing region of the sensor. The image 710 includes multiple (in this case two) native resolutions, meaning most of the image is at one resolution and the image region corresponding to the high resolution patch is at a higher resolution. In this embodiment, the high res patch region 730 of the acquired image 710 may be cropped and used for anti-spoofing. This cropped image 730 may be stored and used later, or it may be provided immediately to the ant-spoofing software module. Alternately, the entire image may be provided to the ant-spoofing software, which may restrict its processing to only the high-resolution patch region of the image, e.g., effectively ignoring the remainder, low resolution portion of the image. Next, the original multi-resolution image 710 is processed to adjust the resolution of the higher resolution region to match the resolution of the lower resolution region of the image. For example, the higher resolution patch region may be down-sampled or averaged so that one full-size image 720 at the lower resolution is produced. In this manner, the downstream software (e.g., matcher or other software application) would need no modification.

In another embodiment, images 720 and 730 are acquired in two steps. In the first step, a certain firing mechanism is used to address pixel to obtain a full-size image 720 at a uniform resolution corresponding to the lower resolution of the low resolution region. For example, if the high resolution patch has a 2× resolution relative to the low resolution region, then every other row and column in the patch area is addressed. The resulting lower resolution image 720 could be used for matching purposes. In the second step, a high-resolution image 730 is acquired in just the patch area, e.g., only the high resolution patch region pixel elements are addressed. This high resolution image could be sent to the host processing system 104 for anti-spoofing use.

FIG. 8 illustrates a flow chart 800 for processing an image obtained with a multi-resolution biometric sensor (600, 650) having a low resolution sensing region (620, 670) and a high resolution sensing region (610, 660), where the low resolution sensing region has a resolution lower than a resolution of the high resolution sensing region, according to an embodiment. At step 810, an initial prompt is provided to the user to begin the fingerprint acquisition process. For example, the user may be explicitly instructed to touch or swipe the user's finger on the sensor 102. At step 820, a first image 710 of the user's fingerprint is acquired by processing system 104 using sensor 102 (e.g., sensor 600 or 650). The first image 710 (and any subsequent images) may be stored to memory 108 or template storage 110 or elsewhere in the system. The first image includes a first image area corresponding to the low resolution sensing region (620, 670) of the sensor and a second image area corresponding to the high resolution sensing region (610, 660) of the sensor, wherein the first image area has a first resolution lower than a second resolution of the second image area. The first image 710 may include some but not all of the user's fingerprint pattern.

At step 830, a high resolution region of the image is determined, e.g., for later use by an anti-spoofing application. In one embodiment, the first (low resolution) image area of the image is removed, e.g., cropped, to produce a reduced image 730 comprising only the second (high resolution) image area. Alternatively, the second image area is tagged or identified in the first image, e.g., by starting row and column and ending row and column, so that a processing application (e.g., anti-spoofing application) may easily use only the high resolution area if desired. At step 840, a substantially uniform-resolution image (e.g., low resolution) 720 is produced. The second (high) resolution of the second image area (corresponding to high resolution patch) in the image 710 is adjusted to match the first resolution to produce a substantially uniform-resolution image 720. In one embodiment, the resolution is adjusted by down-sampling or decimating pixels of the second, higher resolution image area to match the resolution in the lower resolution image area. Alternatively, the resolution is adjusted by averaging pixel values of the second image area.

At step 850, the uniform resolution image 720 and the high resolution patch image 730 (or the dual resolution image 710, including patch region identification information) are provided to the software suite 120 for processing. For example, matcher 122 may use the uniform resolution image 720 to determine whether biometric information in the image matches biometric information stored in a matching database, so as to validate or authenticate the fingerprint information. Anti-spoofing software may process the high resolution patch image 730 (or the dual resolution image 710, including patch region identification information) to determine whether the biometric information included in the image is a legitimate fingerprint image. For example, the anti-spoofing application may identify micro-features and/or defects of the fingerprint within the image 730. Results of the processing may be displayed to the user and/or the user may be otherwise alerted that the results were successful or unsuccessful. For example, the user may be shown an image of the fingerprint (with fake biometric data to preserve biometric security) or the user may be taken to a specific post-authentication page, or instructed to re-input the fingerprint, or alerted that there are other problems.

FIG. 9 illustrates a flow chart 900 for processing an image obtained with a multi-resolution biometric sensor (600, 650) having a low resolution sensing region (620, 670) and a high resolution sensing region (610, 660), where the low resolution sensing region has a resolution lower than a resolution of the high resolution sensing region, according to an embodiment. At step 910, an initial prompt is provided to the user to begin the fingerprint acquisition process. For example, the user may be explicitly instructed to touch or swipe the user's finger on the sensor 102. At step 920, a first image of the user's fingerprint is acquired by processing system 104 using sensor 102 (e.g., sensor 600, 650). The first image (and any subsequent images) may be stored to memory 108 or template storage 110 or elsewhere in the system. The first image includes a first image area corresponding to only the high resolution sensing region (610, 660) of the sensor. For example, only the pixels corresponding to the high resolution region are addressed in step 920. At step 930, a second image of the input object is acquired using both the high resolution sensing region and the low resolution sensing region of the multi-resolution sensor. Here, the second image is acquired with the high resolution sensing region operating in a low resolution mode such that the second image has a uniform resolution corresponding to the low resolution of the low resolution sensing region. For example, in one embodiment, where the pitch of the high resolution patch is a factor N times the pitch of the low resolution region, every Nth pixel of the high resolution region may be addressed as all pixels of the low resolution are addressed.

At step 940, the first image (high resolution only) and the second image (low resolution) are provided to the software suite 120 for processing. For example, matcher 122 may use the second image to determine whether biometric information in the image matches biometric information stored in a matching database, so as to validate or authenticate the fingerprint information. Anti-spoofing software may process the first (high resolution) image to determine whether the biometric information included in the image is a legitimate fingerprint image. For example, the anti-spoofing application may identify micro-features and/or defects of the fingerprint within the first image of the fingerprint.

Note that the embodiments herein are applicable to any image sensor regardless of sensing technology. Also, it is simplest to make the high resolution an integer multiple of the lower one, but that is not strictly necessary. It should also be appreciated to one skilled in the art that the systems and methods described herein with regard to fingerprint sensing are equally applicable to other biometric pattern sensing modalities using small sensors or which may require repeated biometric pattern entry. For example, other biometric patterns may include, among other possibilities, iris patterns, palm prints, vein patterns, and faces.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the embodiments of the disclosure unless otherwise claimed. No language in the specification should be construed as indicating any non-claimed element as essential to the practice the embodiments of the disclosure.

Various embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this specification includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of processing an image obtained with a multi-resolution biometric sensor having a first sensing region and second sensing region, the first sensing region having a resolution lower than a resolution of the second sensing region, the method comprising:
    acquiring a first image of an input object, the first image including an area of the input object imaged by only the second sensing region of the multi-resolution biometric sensor;
    acquiring a second image of the input object, the second image including an area of the input object imaged by the first sensing region and an area of the input object imaged simultaneously by the second sensing region of the multi-resolution biometric sensor; and
    processing each of the first image and the second image to determine biometric information of the input object.

2. The method of claim 1, wherein the first sensing region at least partially circumscribes the second sensing region.

3. The method of claim 1, wherein the first image and the second image are imaged separately in time, wherein the second image is acquired with the second sensing region operating in a low resolution mode such that the second image has a uniform resolution at the resolution corresponding to the first sensing region.

4. The method of claim 3, wherein the second region operating in the low resolution mode includes addressing a portion of address lines of the second sensing region.

5. The method of claim 1, wherein an initial image of the input object is imaged using both the first sensing region and the second sensing region simultaneously,
    wherein the acquiring the first image includes cropping the initial image to remove the area of the input object imaged by the first sensing region, and
    wherein the acquiring the second image includes adjusting a resolution of the area of the input object imaged by the second sensing region to match the resolution of the first sensing region to produce a uniform-resolution image.

6. The method of claim 5, wherein the adjusting the resolution includes down-sampling the area of the input object imaged by the second sensing region.

7. The method of claim 1, wherein the input object includes a fingerprint.

8. The method of claim 7, wherein the processing includes processing the first image to determine whether the fingerprint is a legitimate fingerprint.

9. The method of claim 7, wherein the processing includes validating the fingerprint using the second image.

10. The method of claim 1, wherein the second sensing region of the sensor comprises sensor electrodes disposed at a pitch less than a sensor electrode pitch of sensor electrodes disposed in the first sensing region.

11. The method of claim 1, wherein sensor electrodes of the first sensing region are electrically connected to sensor electrodes of the second sensing region.

12. The method of claim 1, wherein the multi-resolution biometric sensor includes one of a transcapacitive sensor, an absolute capacitive sensor, an optical sensor, a thermal sensor, or an ultrasonic sensor.

13. A biometric input device comprising:
    a sensor region having a first sensing region and second sensing region, the first sensing region having a resolution lower than a resolution of the second sensing region, wherein the second sensing region is at least partially circumscribed by the first sensing region; and
    a processing system configured to determine biometric information from an input object in the sensor region, wherein the processing system is configured to:
    determine a low resolution image of a first area of the input object in the sensor region using both the first sensing region and the second sensing region simultaneously, the low resolution image of the first area of the input object including an image portion of the input object imaged by the first sensing region and an image portion of the input object imaged simultaneously by the second sensing region; and
    determine a high resolution image of a second area of the input object in the second sensing region.

14. The biometric input device of claim 13, wherein the processing system is configured to determine the low resolution image of the first area of the input object in the sensor region by down sampling the image portion of the input object imaged by the second sensing region.

15. The biometric input device of claim 13, wherein the input object includes a fingerprint.

16. The biometric input device of claim 15, wherein the processing system is configured to determine if the fingerprint is a legitimate fingerprint using the high resolution image.

17. The biometric input device of claim 15 wherein the processing system is configured to validate an identity of the fingerprint using at least the low resolution image.

18. The biometric input device of claim 15, wherein the biometric input device comprises one of a transcapacitive sensor, an absolute capacitive sensor, an optical sensor, a thermal sensor, or an ultrasonic sensor.

19. The biometric input device of claim 13, wherein the second sensing region comprises sensor electrodes disposed at a pitch less than a sensor electrode pitch of sensor electrodes disposed in the first sensing region.

20. An electronic device comprising:
a fingerprint sensor having a first sensing region and second sensing region, the first sensing region having a resolution lower than a resolution of the second sensing region, wherein the second sensing region is at least partially circumscribed by the first sensing region; and
a processing system communicably coupled with the fingerprint sensor, the processing system configured to determine biometric information from a fingerprint proximal the fingerprint sensor, wherein the processing system is configured to:
determine a low resolution image of a first area of the fingerprint using both the first sensing region and the second sensing region simultaneously, the low resolution image of the first area of the fingerprint including an area of the fingerprint imaged by the first sensing region and an area of the fingerprint imaged simultaneously by the second sensing region; and
determine a high resolution image of a second area of the fingerprint in the second sensing region.

21. The electronic device of claim 20, wherein the second area of the fingerprint comprises at least a portion of the first area of the fingerprint.

22. The biometric input device of claim 13, wherein the second area of the input object comprises at least a portion of the first area of the input object.

* * * * *